United States Patent Office 3,705,050
Patented Dec. 5, 1972

---

3,705,050
GLASS ARTICLE HAVING ROUGHENED, ENAMEL SURFACE AND METHOD FOR FORMING SAME
Allison L. Smith, Vineland, N.J., assignor to Owens-Illinois, Inc.
No Drawing. Original application Jan. 6, 1966, Ser. No. 518,997, now Patent No. 3,544,508, dated Dec. 1, 1970. Divided and this application Apr. 9, 1970, Ser. No. 27,165
Int. Cl. C03c 17/00
U.S. Cl. 117—46 FA
12 Claims

ABSTRACT OF THE DISCLOSURE

A glass article having a roughened or matte finish marking area on its surface consisting essentially of a vitreous enamel and to a process for producing such a marking area on a surface of a glass article, which area may subsequently be marked with indicia by a suitable instrument, such as a graphite pencil, and be capable of retaining the indicia in such manner that the indicia will not be susceptible to being readily removed during normal handling of the surface.

---

CROSS-REFERENCE TO RELATED APPLICATIONS

The present application is a division of copending U.S. application Ser. No. 518,997, filed Jan. 6, 1966, and now Pat. No. 3,544,508, issued Dec. 1, 1970.

BACKGROUND OF THE INVENTION

Field of the invention

In the production of laboratory glassware, including beakers, flasks, test tubes, culture tubes, Petri dishes, etc., it is often necessary to provide a small area on the surface of the glassware upon which one may write, usually with a graphite pencil, identifying indicia relating to the contents of the glassware.

Description of the prior art

One known method of providing such a writing area has been by sandblasting the particular area of the glass surface. This procedure, however, is relatively costly. Furthermore, the sandblasted surface provides only a limited contrast between the pencil marking and the background upon which it is placed, and this lack of contrast impairs the legibility of the markings.

A more economical method of producing marking areas on laboratory glassware is by applying to the glass a white or light-colored vitreous enamel or ceramic composition of the desired area and configuration, and then by firing the enamel thereon so that it softens or melts and is bonded or fused to the glass surface. While this method has advantages in reduced cost and legibility, successful application of this method depends upon the development and use of suitable vitreous enamels for the particular glass surfaces to be coated. Some of the commercially available vitreous enamels have serious limitations in providing a suitable marking area. For example, while many of such marking areas are capable of accepting writing, such as writing by means of a graphite pencil, the writing is readily smudged or erased when the surface is rubbed, even lightly, with the fingers during normal handling of the glassware. Thus, pencil markings placed on such a surface are apt to be either blurred or even removed when the glass article is handled, unless special care is taken during the handling thereof.

Furthermore, with commercially available vitreous enamel colors, the production of a suitable finish for the marking area involves rather precise control of the temperature-time schedule by which the color is fired onto the glass surface. If the peak temperature increases a few degrees above the optimum level, the color will be glossy and thus not suitable for writing. On the other hand, if the temperature does not reach the optimum level, the applied color will be lacking in chemical durability and will be damaged by acids, alkalies and detergents to which the glassware may be exposed during service. In actual practice, commercially available vitreous enamel colors require a degree of temperature control that is not practical in commercial lehring operations. For this reason, many marking areas made of commercially available ceramic colors are usually of inferior quality, either having an insufficient matte surface for good writing thereon or good writing retention, or else being insufficiently resistant to chemical attack during use.

SUMMARY OF THE INVENTION

Accordingly, it is an object of the present invention to provide a glass article having a marking area formed on a surface thereof, which marking area is free of the disadvantages present in known marking areas formed with vitreous enamels or ceramic colors.

It is a further object of the present invention to provide a vitreous enamel color composition suitable for forming a marking area on a glass surface, which area has a minimum of gloss, and has an excellent matte finish for receiving and retaining graphite marking indicia placed thereon.

It is a further object of this invention to provide an improved process for forming a marking area on a glass surface which area has an excellent matte finish for receiving and retaining graphite marking indicia applied thereto, even during normal handling of the marked surface.

In attaining the objects of this invention, one feature resides in forming the vitreous enamel by intimately blending together a major proportion of a finely divided vitreous enamel color component, a minor proportion of a finely divided silica-containing material characterized by having a low or negative coefficient of thermal expansion, and a minor but sufficient amount of a finely divided resin which decomposes or volatilizes at the temperature range at which the vitreous enamel color component begins to soften or melt to bond or fuse onto the glass surface so as to yield a gas or vapor which passes through the composition surface and roughens the surface by the formation of a plurality of minute pinholes, crevices and protuberances thereon.

Another feature of this invention is to apply the aforesaid vitreous enamel composition to a borosilicate glass surface and heat the glass surface and coating thereon to within the annealing temperature range of the glass for a period of time sufficient to soften and fuse the vitreous enamel color to the glass while the resin decomposes or vaporizes to yield a gas which passes through the color composition, resulting in a roughening of the outermost surface of the enamel caused by the formation of many small crevices, pinholes and protuberances therein.

Other objects, features and advantages will become more apparent from the following description of the invention.

DESCRIPTION OF THE PREFERRED EMBODIMENTS

It has been found that an excellent matte finish on a marking area of a glass surface, such as a borosilicate glass surface, can be obtained by the use of a composition containing, as essential components, an intimate mixture of (a) a major proportion of a finely divided vitreous enamel color component, (b) a minor proportion of a finely divided silica-containing material, and (c) a resin which is capable of decomposing or volatilizing at the temperature range within which the vitreous enamel color component begins to soften or fuse to the glass, to yield a gase or vapor which passes through the coated composition. Since most marking area compositions are normally applied to the glass surface by means of a silk screen stencil, the aforesaid mixture also contains a sufficient amount of a screen printing oil, also called squeegee oil, to permit the production of a sharply defined printed area on the glass surface. These known oils have viscosity properties and drying rates such that, when mixed with ceramic colors, the mixture may be readily applied to a glass surface by the silk screen process without screen-clogging, running, or other difficulties being encountered.

The vitreous enamel color components suitable for use with the present invention are the conventional and commercially available decorating enamels (also referred to as "colors"). The flux component of these conventional enamels consists primarily of lead oxide, which oxide provides the low-melting characteristics of the enamel. Analyses of two of the commercially available vitreous enamels or colors are given in Table I, below, listing the weight percent of the various constituents found therein.

TABLE I

| | Weight percent | |
|---|---|---|
| | Composition A (Blue enamel) | Composition B (White enamel) |
| Components: | | |
| $SiO_2$ | 30.87 | 36.17 |
| $B_2O_3$ | 2.45 | 3.14 |
| $Al_2O_3$ | 3.27 | 2.18 |
| $TiO_2$ | 5.98 | 10.28 |
| CdO | 2.2 | 1.27 |
| ZnO | 1.23 | 1.30 |
| PbO | 46.31 | 38.67 |
| CaO | .23 | 0.19 |
| MgO | | 0.11 |
| $Na_2O$ | 2.31 | 3.72 |
| $Li_2O$ | 1.93 | 1.08 |
| $K_2O$ | 1.64 | 0.45 |
| $Sb_2O_3$ | None | 0.39 |
| CoO | 1.39 | None |
| Ignition loss | 0.44 | 0.88 |
| Coefficient of thermal expansion, ° C. | | $82 \times 10^{-7}$ |

Analyses of other commercially available vitreous enamels or colors, suitable for the purpose of this invention, are described in U.S. Patent No. 2,969,293, assigned to the assignee of the present application, and the disclosure of such enamels is incorporated herein by reference. The vitreous enamels primarily suited for the purpose of this invention are the lead oxide type enamels containing at least 35% of PbO and at least 70% of PbO and $SiO_2$ combined. These conventional enamels generally soften at about the annealing temperature range of glass and have coefficients of thermal expansion of about 60 to $90 \times 10^{-7}/$°C.

Examples of the finely divided silica-containing material having a low or negative coefficient of thermal expansion and suitable for the purpose of the composition of this invention are the lithium aluminum silicates, of which beta eucryptite, beta spodumene, and petalite are representative. Amorphous silica is also suitable and has a coefficient of thermal expansion of about $5 \times 10^{-7}/$° C. Beta eucryptite has a coefficient of thermal expansion of about $-60 \times 10^{-7}/$° C. and the other lithium aluminum silicates have negative coefficients of thermal expansion. Also suitable for use in the composition of this invention are finely divided, crystallized glass-ceramics formed by in situ, controlled crystallization of thermally crystallizable glass composition.

These refractory particles of silica-containing materials do not fuse at the firing temperatures to which the vitreous enamel composition of the invention is subjected after being applied to a glass surface. Thus, they prevent the formation of surface gloss on the fired or fused marking areas. This refractory material can also be described as a "flatting" or gloss-preventive agent. However, through experience, it has been found that the presence of such refractories, per se, in a vitreous enamel or color is not sufficient to yield a satisfactory marking area on a glass surface.

Use of these refractories, such as the lithium aluminum silicates, in admixture with the vitreous enamel, also assists in the lowering of the thermal expansion properties of the enamel, as taught in the aforesaid U.S. Patent No. 2,969,293. This reduces the stress between low expansion glass substrates and high expansion colors.

However, it has been found that an excellent composition for producing a matte finish on a glass surface is formed if there is added to the aforesaid major proportion of vitreous enamel component and minor proportion of silica-containing material, a minor but sufficient amount of an organic resin capable of decomposing or volatilizing to yield a gas or vapor at the temperature range at which the vitreous enamel softens and fuses to the glass surface so as to produce a roughened coated surface on the glass. The roughened surface or matte finish is formed by the gas or vapor passing through the coating composition and forming pinholes, crevices and protuberances thereon, as viewed under a microscope. Among the organic resins are the fluoroplastics and, in particular, polytetrafluoroethylene having a molecular weight of from about 10,000 to about 100,000. Polytetrafluoroethylene is commercially avialable in powder form, with a particle size of about 20 microns, under the trademark Teflon. A further description of the fluoroplastics and polytetrafluoroethylene is to be found in Modern Plastics Encyclopedia, 1966, pages 153–156.

While the invention will now be described in terms of a specific composition range suitable for forming a marking area on a borosilicate glass surface, it is to be understood that the scope of the invention is not to be considered as being limited to such a description.

The following composition has been found to be excellent for forming a matte finish on a marking area of a borosilicate glass surface.

| | Parts by weight |
|---|---|
| Vitreous enamel | 85 to 95 |
| Lithium aluminum silicate | 5 to 15 |
| Polytetrafluoroethylene | 2 to 10 |
| Screen printing oil | 28 to 36 |

The particles of enamel, silicate and polytetrafluoroethylene, which are in intimate mixture, are less than about 44 microns in size (diameter), to prevent clogging of the screen in screen stencil printing. The screen material normally used has 250 mesh openings per inch or openings of 61 microns. There is no objection to the particle size being finer than this, but it must not be coarser. Good results are obtained when a major proportion of the particles are in the range of from about 1 to about 20 microns.

Example I.—A marking area having an excellent matte finish suitable for receiving and retaining marking indicia applied thereto with a graphite pencil was formed on a borosilicate surface. First, a vitreous enamel was prepared by physically mixing in a ball mill a mixture of the following listed ingredients:

90 parts by weight of vitreous enamel powder (Composition B, supra)

10 parts by weight of beta eucryptite powder 4 parts by weight of polytetrafluoroethylene (Teflon)

A paste of the resulting mixture was made by adding to the mixture 32 parts by weight of screen printing oil and the vitreous enamel paste was appied to the surface of a borosilicate glass beaker by passing it through a silk screen stencil. A small area of the beaker surface was thus coated with the enamel.

The coated beaker was then carried through an annealing lehr which was at the temperature range of about 1030° F. to 1050° F. and the vitreous enamel softened and fused onto the borosilicate surface. While the vitreous enamel was softened, the polytetrafluoroethylene decomposed, yielding gas which passed through the enamel coating layer and caused a plurality of crevices, pinholes and protuberances to form on the outer surface of the coating as the heating continued. When cooled to room temperature and examined, the coated surface of the beaker had a "flat," nonglare, matte finish which was rough to the touch of the finger. Marking thereon with a graphite pencil and subsequently rubbing a finger over the marked surface had only a negligible effect on the legibility of the marking.

Example II.—The process of Example I was repeated, except that no polytetrafluoroethylene was present in the mixture. The resulting marking area had a relatively higher degree of gloss and when the finger was subsequently rubbed, in the same manner as in Example I, over the graphite indicia applied thereto, the indicia first became smudged and then became illegible due to being substantially removed from the surface.

What apparently causes the difference is that the roughened marking area surface obtained by the process of Example I absorbs the graphite in the minute crevices and openings so that a finger rubbed against the surface does not reach into these crevices and openings to remove the graphite. However, with the marking area surface of Example II, which is relatively smoother, the finger readily removes the graphite which is placed upon the smooth, glossy surface.

The particular composition range given above is suitable for applying a marking area onto a borosilicate glass surface which is enameled within a temperature range of about 1000° F. to about 1100° F. The particular borosilicate glass used in the examples had a composition, as analyzed, of 80.5 weight percent $SiO_2$, 13 weight percent $B_2O_3$, 2.5 weight percent $Al_2O_3$, and 4 weight percent $Na_2O$. Such a glass has an annealing temperature range of 1030° F. to 1050° F.

However, vitreous enamels or colors are manufactured for use over a wide range of firing temperatures, beginning with 900° F. and going on up. It is desirable, however, to use vitreous enamels which can be fired within the annealing temperature range of the glass surface to which they are being applied, since it is desirable to anneal the glass and fire the colors in the same operation. The colors selected are those having the optimum chemical resistance at these firing temperatures.

With the borosilicate glass composition of Examples I and II, it has been found that vitreous enamel compositions containing more than 15 parts by weight of lithium aluminum silicate are difficult to fuse onto the glass at the prescribed temperature range and such compositions are found to yield enamels having poor chemical resistance. Less than 5 parts by weight of lithium aluminum silicate were tried and were found to have negligible effect on the properties of the mixture.

When less than 2 parts by weight of polytetrafluoroethylene (Teflon) were used in the vitreous enamel composition, it had only a negligible effect on the properties of the mixture. Amounts greater than 10 parts were unsatisfactory because of an adverse effect on the flow characteristics of the enamel-printing oil mixture. The viscosity rapidly increases to an unworkable consistency.

The quality of the surface of the marking area of the present invention is not appreciably affected by normal temperature variations in a commercial annealing lehr and the applied color has adequate durability when fired over a considerable range of temperature. The unique property of the tetrafluoroethylene resin is that it will decompose at temperatures where the ceramic color is sintering or is just beginning to soften. The decomposition of the resin involves both vaporization and combustion. This decomposition roughens the surface of the color and many small crevices and protuberances are formed. Further heating shrinks the color and opens up the crevices. Over-heating, which in a commercially available color would produce an unsatisfactory, glossy surface, merely melts the crevices to form many pinholes and depressions without detracting from the writing characteristic of the surface.

In view of the above disclosure and from an understanding of the invention, one having skill in the art may now adapt the teachings of the invention to the formation on glass surfaces of matte finishes having minute crevices, protuberances and pinholes which provide ideal surfaces for receiving and retaining marking indicia, such as from a graphite pencil.

What is claimed is:
1. A method for forming a matte finish on an area of a glass surface, which finish is receptive to and retains graphite marking indicia thereon during normal handling of said surface, said method comprising the steps of:
  intimately admixing together with 85–95 parts by weight of a vitreous enamel containing at least 35 percent by weight of PbO and at least 70 percent by weight of PbO and $SiO_2$, the following components;
  about 5–15 parts by weight of finely divided silica-containing materials selected from the group consisting of amorphous silica, lithium aluminum silicate and crystallized glass-ceramic, and
  about 2–10 parts by weight of finely divided polytetrafluoroethylene resin;
  applying the resulting intimate admixture to said area of said glass surface;
  subjecting said glass surface with the resulting intimate admixture thereon to a temperature sufficient to fire said vitreous enamel composition and said silica-containing material onto said glass surface and to concurrently cause said polytetrafluoroethylene resin to volatilize sufficiently to impart a roughened matte surface finish on the resulting fired admixture.
2. The method as defined in claim 1, wherein said silica-containing material comprises beta spodumene.
3. The method as defined in claim 1, wherein said silica-containing material comprises petalite.
4. The method as defined in claim 1, wherein said glass surface is a borosilicate glass surface.
5. The method as defined in claim 1, wherein said silica-containing material comprises beta eucryptite.
6. The method as defined in claim 1, wherein said firing temperature is within the annealing temperature range of the glass.
7. The method as defined in claim 1, wherein said firing temperature is in the range of from about 1000° F. to about 1100° F.
8. A glass article having a marking area prepared by the method of claim 1.
9. The glass article as defined in claim 8, wherein said silica-containing material comprises beta spodumene.
10. The glass article as defined in claim 8, wherein said silica-containing material comprises petalite.
11. The glass article as defined in claim 8, wherein said silica-containing material comprises beta eucryptite.
12. The glass article as defined in claim 8, wherein said article is a borosilicate glass article.

References Cited
UNITED STATES PATENTS

| | | | |
|---|---|---|---|
| 2,969,293 | 1/1961 | Smith | 106—49 |
| 2,668,157 | 2/1954 | Emig et al. | 260—23 |
| 2,305,313 | 12/1942 | Kreidl | 106—41 |
| 3,096,184 | 7/1963 | Gallup | 106—49 X |
| 3,068,187 | 12/1962 | Bolstad et al. | 117—124 X |

WILLIAM D. MARTIN, Primary Examiner

M. R. LUSIGNAN, Assistant Examiner

U.S. Cl. X.R.

117—124 A, 124 E, 125

UNITED STATES PATENT AND TRADEMARK OFFICE
CERTIFICATE OF CORRECTION

PATENT NO. : 3,705,050
DATED : December 5, 1972
INVENTOR(S) : Allison L. Smith

It is certified that error appears in the above-identified patent and that said Letters Patent are hereby corrected as shown below:

Col. 2, line 15, "retension" should be --retention--; Col. 3 line 4, "gase" should be --gas--; Col. 3, line 40, Table I, last line under "Composition B", "82 x $10^-$" should be --82 x $10^{-7}$--; Col. 4, line 26, "avialable" should be --available--; Col. 4, line 68, "appied" should be --applied--.

Signed and Sealed this

Fifth Day of April 1977

[SEAL]

Attest:

RUTH C. MASON
Attesting Officer

C. MARSHALL DANN
Commissioner of Patents and Trademarks